US008317526B2

(12) United States Patent
Gardner et al.

(10) Patent No.: US 8,317,526 B2
(45) Date of Patent: Nov. 27, 2012

(54) GROUND CLAMP

(75) Inventors: Michael J. Gardner, Hudson, OH (US); Glenn A. Baker, Cleveland, OH (US)

(73) Assignee: Halex Co., Cleveland, OH (US)

( * ) Notice: Subject to any disclaimer, the term of this patent is extended or adjusted under 35 U.S.C. 154(b) by 290 days.

(21) Appl. No.: 12/760,430

(22) Filed: Apr. 14, 2010

(65) Prior Publication Data

US 2010/0261390 A1 Oct. 14, 2010

Related U.S. Application Data

(60) Provisional application No. 61/169,157, filed on Apr. 14, 2009.

(51) Int. Cl.
*H01R 4/66* (2006.01)

(52) U.S. Cl. .......... 439/100; 248/74.1; 24/489; 439/804

(58) Field of Classification Search .................. 439/100, 439/92, 804, 814; 248/74.1, 74.4; 24/489, 24/517
See application file for complete search history.

(56) References Cited

U.S. PATENT DOCUMENTS

| | | | | |
|---|---|---|---|---|
| 3,537,150 | A | * | 11/1970 | Emberson ..................... 403/344 |
| 3,933,377 | A | | 1/1976 | Arrowood |
| 3,988,052 | A | * | 10/1976 | Mooney et al. ............... 439/804 |
| 4,004,767 | A | | 1/1977 | Chilton |
| 4,059,872 | A | * | 11/1977 | Delesandri ...................... 24/284 |
| 4,632,221 | A | * | 12/1986 | Stanford ..................... 182/186.8 |
| 5,040,751 | A | | 8/1991 | Holub |
| 5,193,769 | A | | 3/1993 | Hofle |
| 5,622,341 | A | * | 4/1997 | Stana ........................... 248/74.1 |
| 5,746,401 | A | | 5/1998 | Condon |
| 6,976,857 | B1 | * | 12/2005 | Shukla et al. ................. 439/100 |
| 7,182,611 | B2 | * | 2/2007 | Borden et al. .................. 439/92 |
| 7,284,728 | B2 | | 10/2007 | Connolly |
| 7,559,512 | B1 | | 7/2009 | diGirolamo et al. |
| 7,621,763 | B2 | * | 11/2009 | Clark et al. ................... 439/100 |
| 8,021,169 | B1 | * | 9/2011 | Smith .......................... 439/100 |

OTHER PUBLICATIONS

Halex Product Brochure 2008.

* cited by examiner

*Primary Examiner* — Xuong Chung Trans
(74) *Attorney, Agent, or Firm* — Roger D. Emerson; Timothy D. Bennett; Emerson Thomson Bennett

(57) ABSTRACT

A clamp may include two clamping members that are pivotally connected at one end.

15 Claims, 8 Drawing Sheets

GROUND CLAMP

This application claims priority to U.S. Ser. No. 61/169,157, entitled GROUND CLAMP, filed Apr. 14, 2009, which is incorporated herein by reference.

I. BACKGROUND OF THE INVENTION

A. Field of Invention

The present invention relates to clamps, and more particularly, clamps that have a particular configuration to assist in connecting wires, conduits, rods, rebar, and in particular embodiments, ground wires, rods, and pipes.

B. Description of the Related Art

FIG. 9 shows a known ground clamp 500 that includes first and second clamping members 502, 504, and a retainer 506 that is connected to the first clamping member 502 and is used to secure a ground wire (not shown) to the ground clamp 500. A ground rod (not shown) is secured (clamped) between the first and second clamping members 502, 504 to thereby join in electrical communication the ground wire and the ground rod. In this way the ground wire is "grounded" as is well known to those of skill in the art.

While many known ground clamps work well for their intended purposes, their use can be cumbersome and time consuming. The ground clamp 500, for example, requires first that the first and second clamping members 502, 504 be properly aligned with each other around the ground rod. Then, two separate fasteners 508, 510 must be inserted within openings formed in the clamping members 502, 504 and then each fastener must be tightened to clamp the ground rod between the first and second clamping members 501, 504. A third fastener 512 may be used to secure the ground wire to the retainer 506.

What is needed is a ground clamp that minimizes the problems mentioned above as well as improving the existing technology in this field in other ways.

II. SUMMARY OF THE INVENTION

According to one embodiment of this invention, a clamp may comprise: a first clamping member having first and second ends and comprising an electrically conductive portion; a second clamping member having first and second ends; a pivotal connection that pivotally connects the first end of the first clamping member to the first end of the second clamping member; wherein the first and second clamping members are usable to clamp a first associated object; a retainer operatively connected to the first clamping member that is designed to secure a second associated object to the clamp; and, wherein the first and second clamping members are positional by pivoting the first clamping member with respect to the second clamping member about the pivotal connection between: (1) a clamped condition where the first and second clamping members join in electrical communication through the electrically conductive portion of the first clamping member the first associated object and the second associated object; and, (2) an unclamped condition where the first and second clamping members do not join in electrical communication the first associated object and the second associated object.

According to another embodiment of this invention, a clamp may comprise: a first clamping member having first and second ends; a second clamping member having first and second ends; a pivotal connection that pivotally connects the first end of the first clamping member to the first end of the second clamping member, the pivotal connection comprising a pivot pin and a pivot bracket that comprises at least two pivot pin receiving recesses that enable a user to adjust the size of the clamp between at least two corresponding sizes; and, wherein the first and second clamping members are positional by pivoting the first clamping member with respect to the second clamping member about the pivotal connection in both sizes between: (1) a clamped condition where the first and second clamping members secure a first associated object to the clamp; and, (2) an unclamped condition where the first and second clamping members do not secure the first associated object to the clamp.

According to yet another embodiment of this invention, a clamp may comprise: a first clamping member having first and second ends; a second clamping member having first and second ends; a pivotal connection that pivotally connects the first end of the first clamping member to the first end of the second clamping member; a device that connects the second end of the first clamping member to the second end of the second clamping member; wherein the first and second clamping members are positional by pivoting the first clamping member with respect to the second clamping member about the pivotal connection between: (1) a clamped condition where the first and second clamping members secure a first associated object to the clamp; and, (2) an unclamped condition where the first and second clamping members do not secure the first associated object to the clamp; and, a retainer operatively connected to the first clamping member that is designed to secure a second associated object to the clamp.

One advantage of this invention is that the clamping members of a clamp can be quickly and easily aligned.

Another advantage of this invention is that the clamping members of a clamp can be quickly and easily adjusted to accommodate objects of differing sizes.

Yet another advantage of this invention is that a clamp requires fewer fasteners than those currently used.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
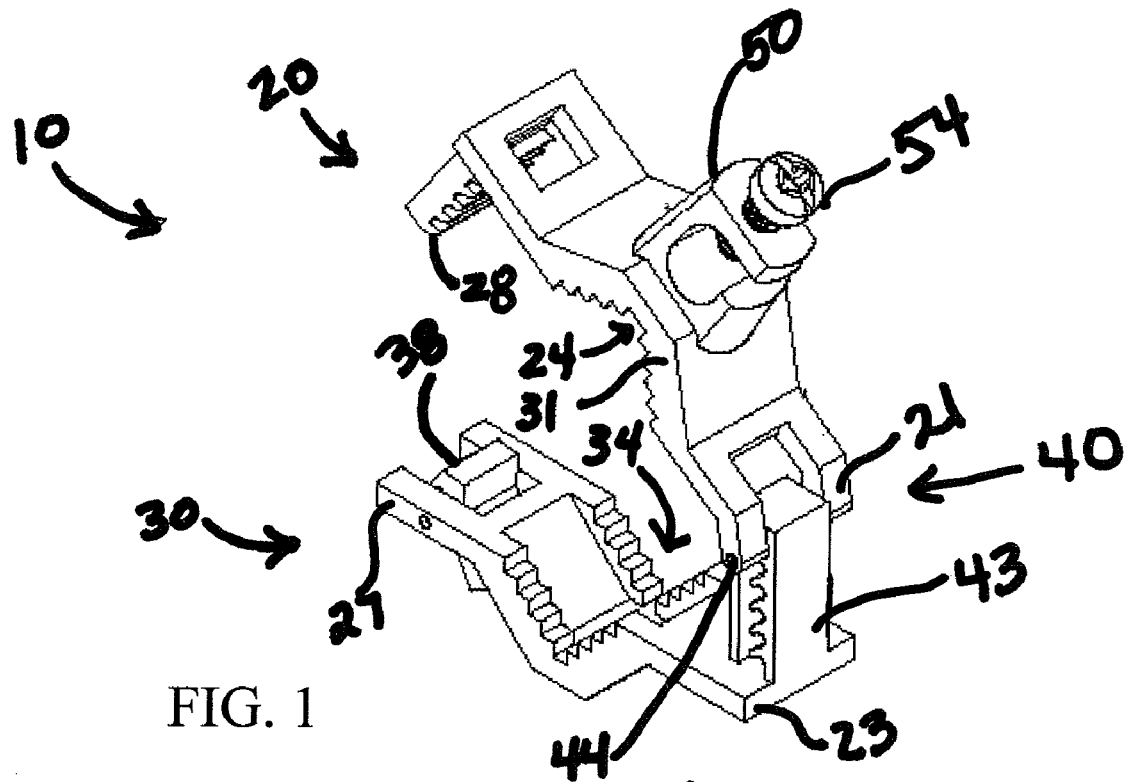
FIG. 1 is a perspective view of a clamp according to an embodiment of the subject invention.
Figure 2:
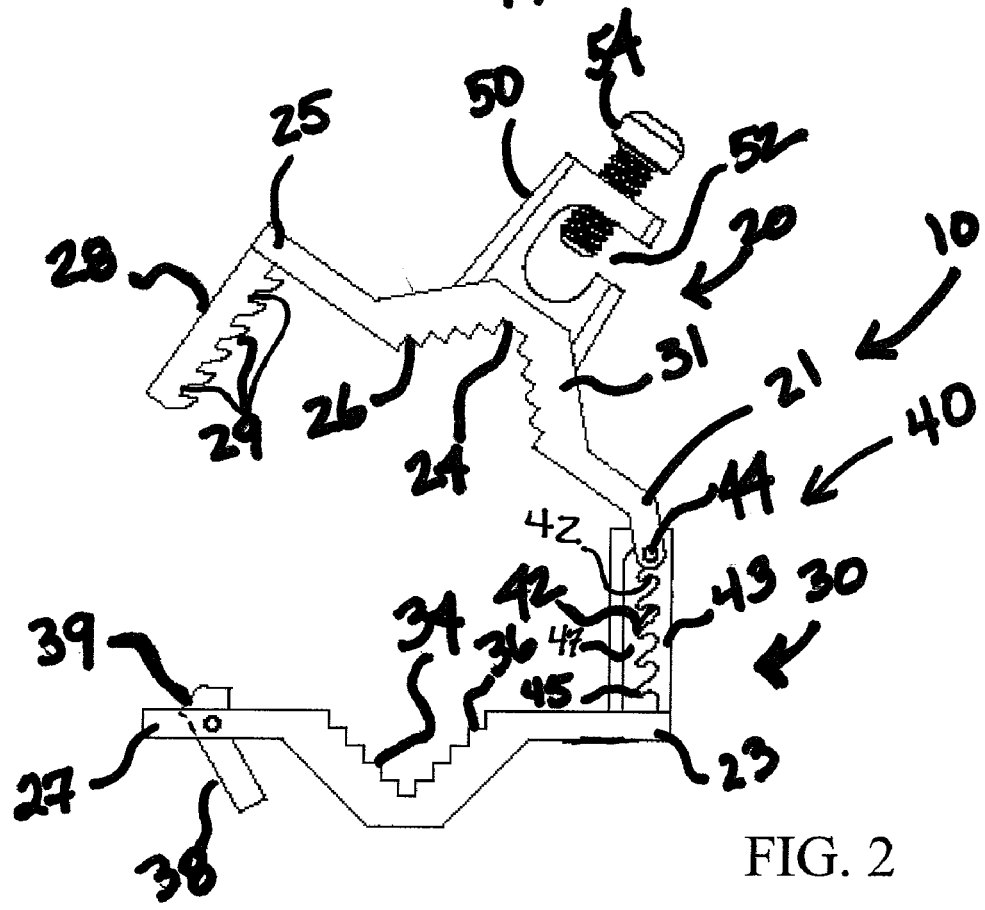
FIG. 2 is a side view of the clamp of FIG. 1.

Referring now to the drawings wherein the showings are for purposes of illustrating embodiments of the invention only and not for purposes of limiting the same, and wherein like reference numerals are understood to refer to like components, FIGS. 1-8 show clamps 10, 10*a* that may be used in joining in electrical communication a first object 60 that is in physical contact with the ground (including but not limited to a ground rod, pipe, and rebar) with a second object 70 (including but not limited to a ground wire). In this way the ground wire is "grounded" as is well known to those of skill in the art so further details will not be provided here. When used for this purposes, the clamps 10, 10*a* may be formed, fully or at least in part of electrically conductive material, such as, without limitation, bronze. However, the clamps 10, 10*a* may be used in any other application chosen with the sound judgment of a person of skill in the art.

Figure 3:
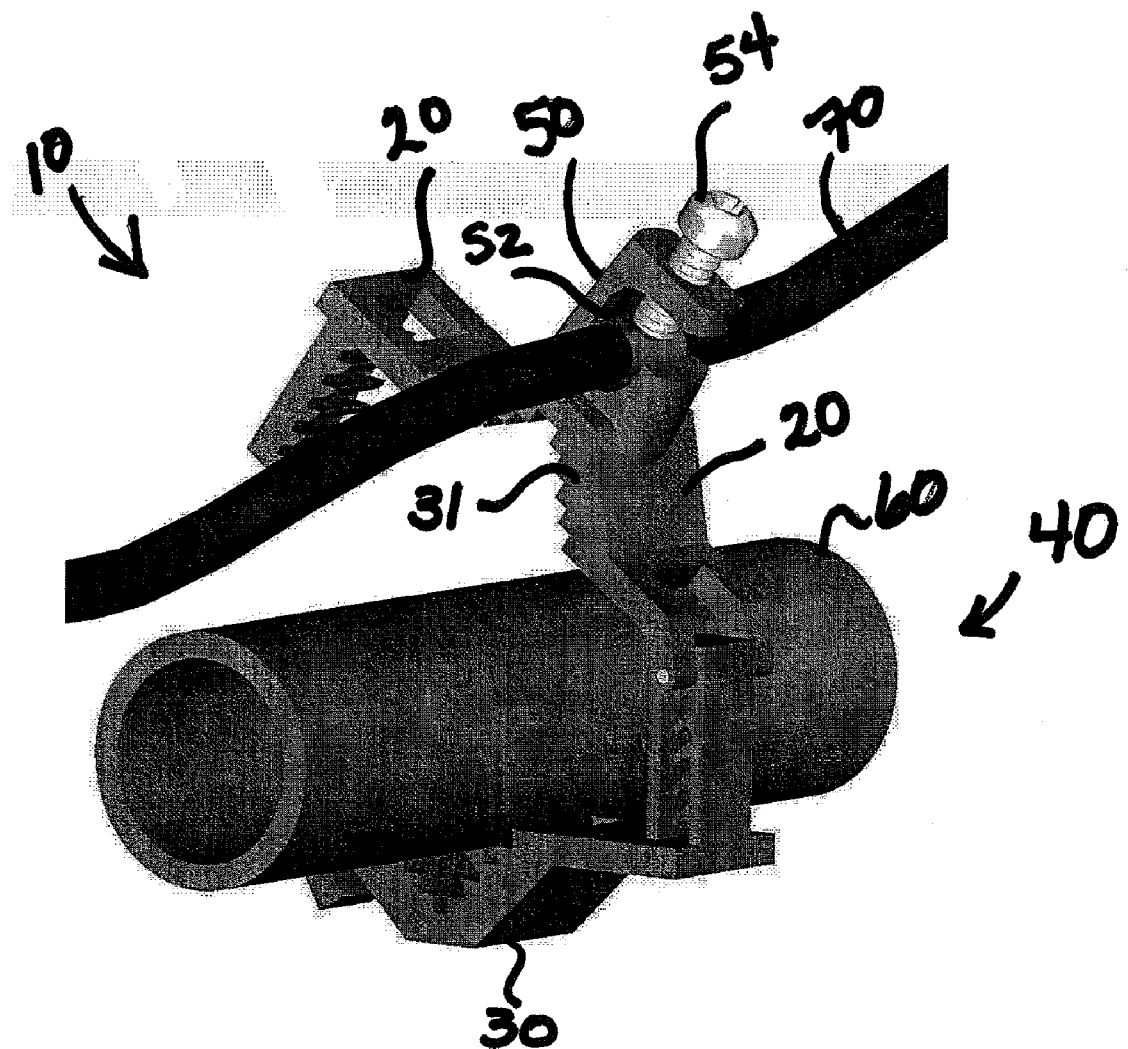
FIG. 3 is a perspective view of the clamp of FIG. 1, shown in open arrangement with a ground rod and ground wire, according to an embodiment of the subject invention.
Figure 4:
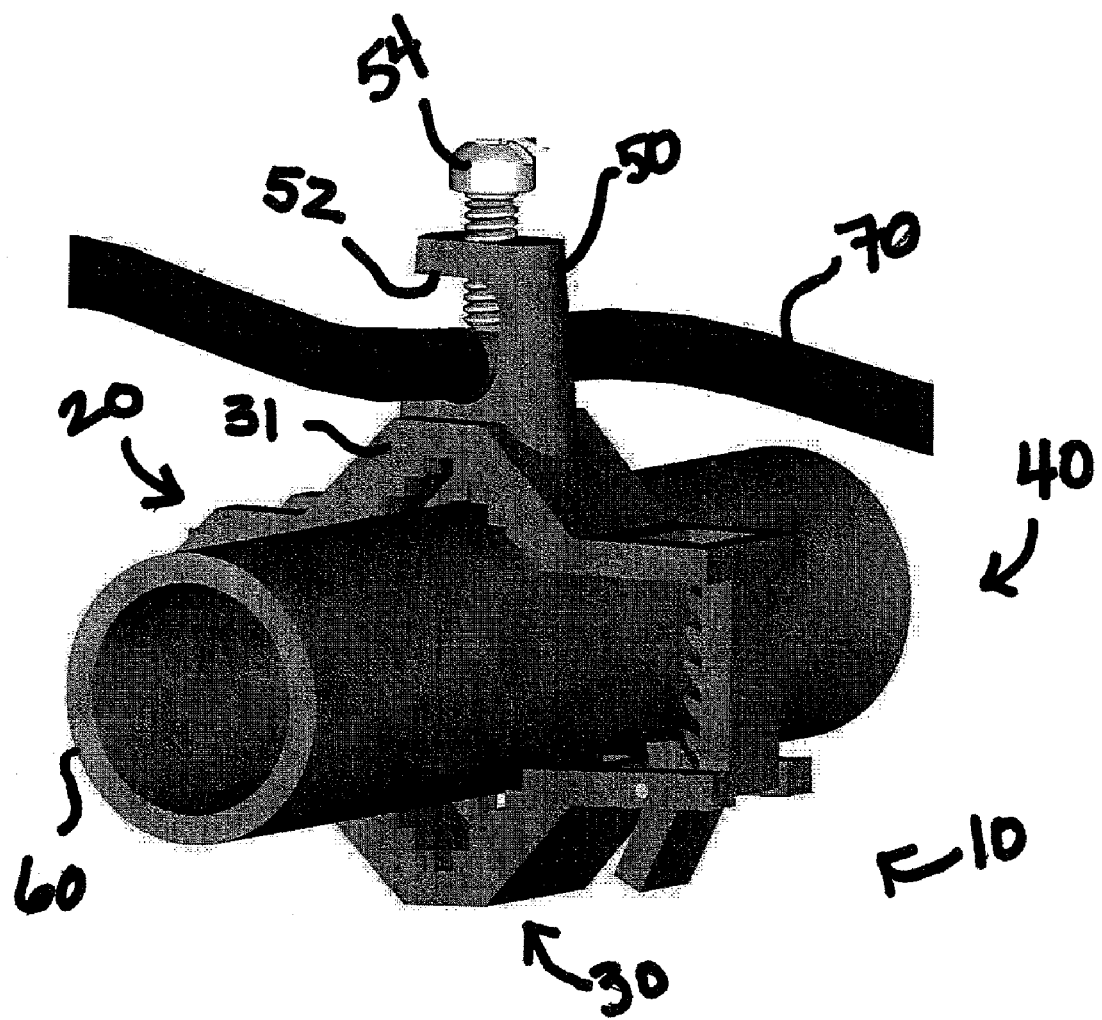
FIG. 4 is a perspective view of the clamp of FIG. 3 shown in a closed arrangement.
Figure 5:
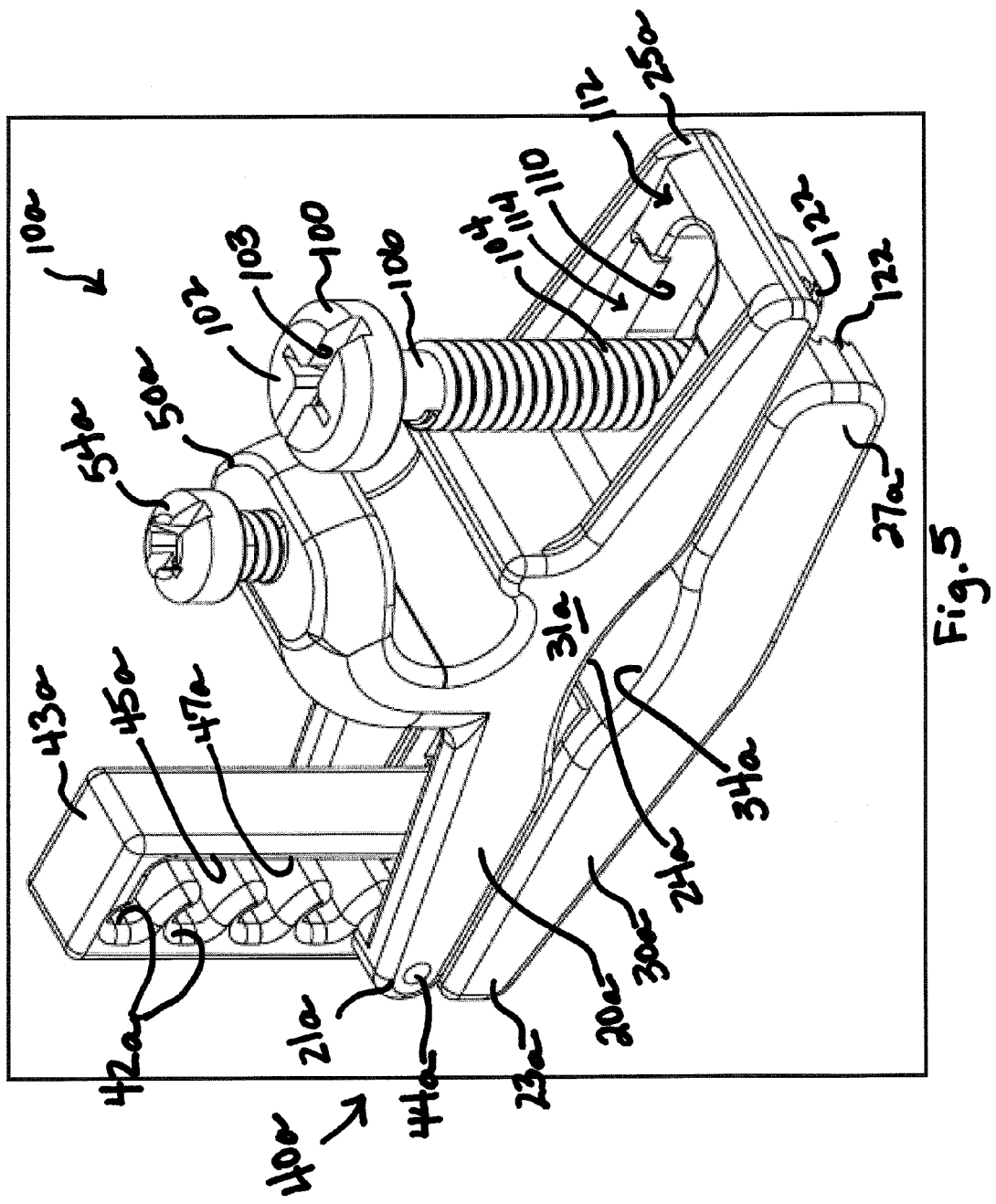
FIG. 5 is a perspective view of a clamp according to another embodiment of the subject invention.

With reference now to FIGS. 1-4, clamp 10 generally comprises first and second clamping members 20, 30 each having first ends 21, 23 and second ends 25, 27 as shown. The first and second clamping members 20, 30 may be used to secure or clamp a first object 60 (such as a ground pipe 60, for example, as shown in FIGS. 3-4). The first and second clamping members 20, 30 may include recesses 24, 34 for more fully receiving and contacting the first object 60. Instead of, or in addition to, the recesses 24, 34, the clamping members 20, may include a textured surface 26, 36 for better gripping the first object 60. In one embodiment the first clamping member 20 may have an electrically conductive portion 31. As noted above, in another embodiment, the entire first clamping member 20 may be formed of an electrically conductive material. In yet another embodiment, any portion (or all) of the second clamping portion 30 may also be formed of an electrically conductive material.

A pivotal connection 40 may be used to pivotally connects the first end 21 of the first clamping member 20 to the first end 23 of the second clamping member 30. This pivotal motion allows the first and second clamping members 20, 30 to pivot between a clamped condition (shown in FIG. 4) and an unclamped condition (shown in FIG. 3). When in the clamped condition the first and second clamping members 20, 30 may secure or clamp the first object 60 to the clamp 10 and when in the unclamped condition the first and second clamping members 20, 30 do not secure the first object 60 to the clamp 10. When in the unclamped condition, the clamp can be easily moved around or away from the object 60. If grounding is required, when in the clamped condition the first and second clamping members 20, 30 may join in electrical communication through the electrically conductive portion 31 the first object 60 and the second object 70. When in the unclamped condition the first and second clamping members 20, 30 do not join in electrical communication the first object 60 and the second object 70. The pivotal connection 40 permits the first and second clamping members 20, to remain attached to each other regardless of their relative position. This makes alignment of the first and second clamping members 20, 30 with each other and with the first object 60 easy to achieve.

With continuing reference to FIGS. 1-4, the pivotal connection 40 may include a pivot pin 44 as well as a pivot bracket 43 that has a slot 45. The slot 45 may include a plurality of recesses 42 and a connecting passage 47 that communicates the recesses 42. The use of multiple recesses 42 enables the user to adjust the size of the clamp 10 between multiple corresponding sizes to match the size of the object 60. In one embodiment, the pivot pin 44 remains contained in the slot 45 when the clamp is size adjusted and when the first clamping member 20 is pivoted with respect to the second clamping member 30 about the pivotal connection 40 between the clamped condition and the unclamped condition. A device may be used to connect the second ends 25, 27 of the clamping members 20, 30. The device may include a clasp 28, which includes a plurality of notches 29 for engaging interlocking member 38. Interlocking member 38 includes a tip 39, which becomes removably lodged in a recess between notches 29 of clasp 28. Because clasp 28 includes a plurality of notches, a user is further able to selectively size the clamp 10 in association with the size of the first object 60 being received. While the pivot bracket 43 is shown fixed to the first end 23 of the second clamping member 30, the pivot pin 44 is shown attached to the first end 21 of the first clamping member 20, the clasp 28 is shown fixed to the second end 25 of the first clamping member 20 and, the interlocking member 38 is shown attached to the second end 27 of the second clamping member 30, it is to be understood that this locations are exemplary only as these components may be attached in any manner and in any location chosen with the sound judgment of a person of skill in the art.

Clamp 10 may also include a retainer 50 which secures or clamps a second object 70 (such as a ground wire, for example, as shown in FIGS. 3-4). Retainer 50 may be operatively connected to the first clamping member 20 and may include an aperture 52 for receiving the second object 70, which may be in open communication with the exterior of clamp 10 to provide additional access for second object 70. A securing device 54 is engaged to secure second object 70 within aperture 52. In the embodiment shown, securing device 54 is a fastener, but in other embodiments securing device 54 may comprise a cam lock that rotates a cam to force object 70 against the structure surrounding aperture 52.

FIG. 3 shows the clamp 10 in an open position and a wire retained within retainer 50. FIG. 4 shows the clamp 10 of FIG. 3 in a closed position. Each of the objects 60, 70 may comprise a ground pipe, rod, or rebar and ground wire, respectively, as suggested previously, but also any other conduit, pipe, wire, rod, and the like. Likewise, aperture 52 may, in other applications, be larger than the clamped opening formed by first and second members 20, 30.

With reference now to FIGS. 5-8, another clamp 10*a* will now be described. Clamp 10*a* operates in many ways similar to clamp 10 and similar components are given the same reference numbers except with the letter "a" added to the number. The primary difference between clamp 10*a* and clamp 10 is that the device used to connect the second ends 25*a*, 27*a* of the clamping members 20*a*, 30*a* is a fastener 100 (not the clasp 28 and interlocking member 38 used with clamp 10). The fastener 100 may have a first end with a head 102 having a profiled surface 103 that engages a tool, such as a screw driver to rotate the fastener 100, and a second end with a threaded portion 104. In one embodiment the threaded portion 104 extends all along the length of the fastener 100 except the head 102. In another embodiment, shown, a smooth surfaced portion 106 is located between the threaded portion 104 and the head 102. The smooth surfaced portion 106 is beneficial when sliding the fastener 100 as will be discussed further below.

With continuing reference to FIGS. 5-8, to attach the fastener 100 to the clamp 10*a*, each of the second ends 25*a*, 27*a* of the clamping members 20*a*, 30*a* has an opening 110, 120 respectively. These openings 110, 120 can be of any type and size chosen with the sound judgment of a person of skill in the art. For the embodiment shown, the opening 120 is an open ended groove having a threaded portions 122, 122 on its side surfaces. The threaded portions 122, 122 may be sized to engage the threaded portion 104 of the fastener 100. This provides an easy way to engage the fastener 100 to the opening 120. Specifically, the threaded portion 104 of the fastener 100 can be slid into the opening 120 from the open end at any desired relative position and as this sliding action occurs, the threaded portions 122, 122 of the opening 120 receive the threaded portion 106 of the fastener 100 at a desired relative vertical position. If additional vertical relative adjustment of the fastener 100 is required with respect to the second clamping member 30a, the fastener 100 can be rotated with respect to the second clamping member 30a (such as with a tool engaged with profiled surface 103) while the threaded portion 106 of the fastener 100 engages with the threaded portion 122 of the opening 120.

Figure 6:
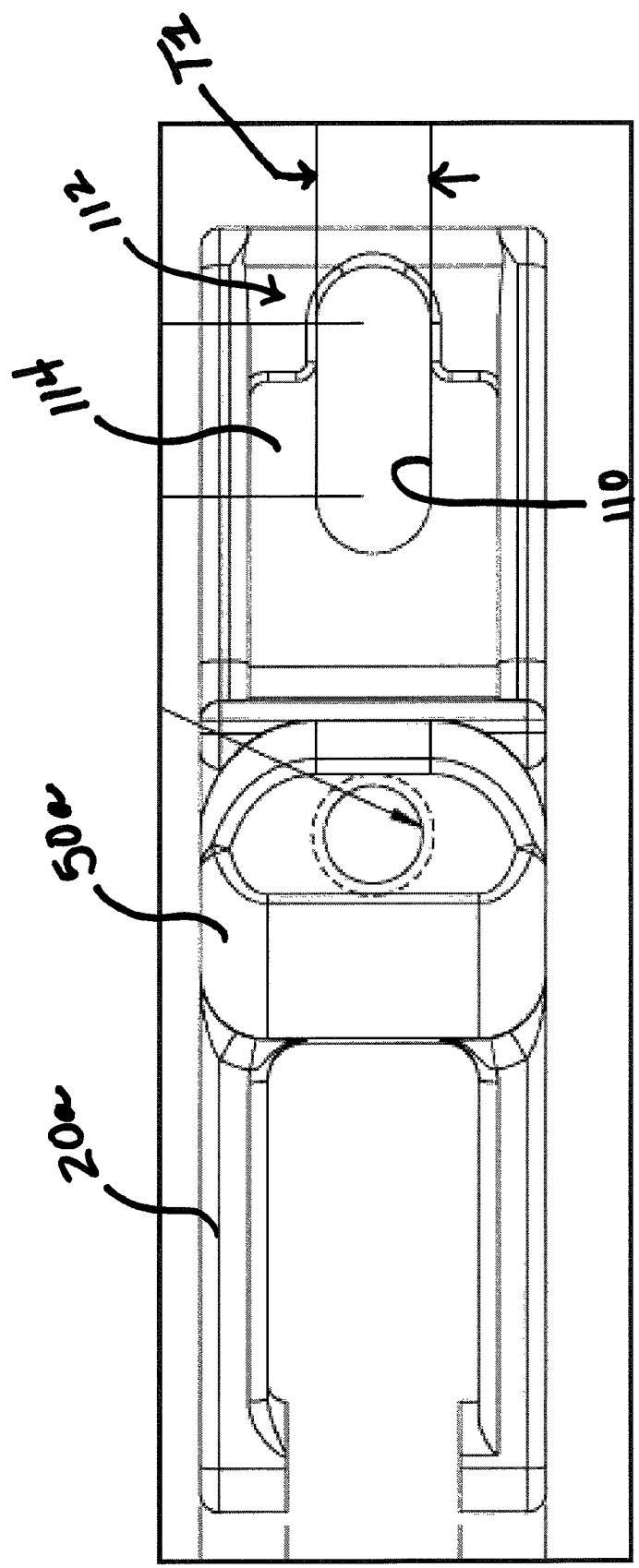
FIG. 6 is a top view of the clamp of FIG. 5.
Figure 7:
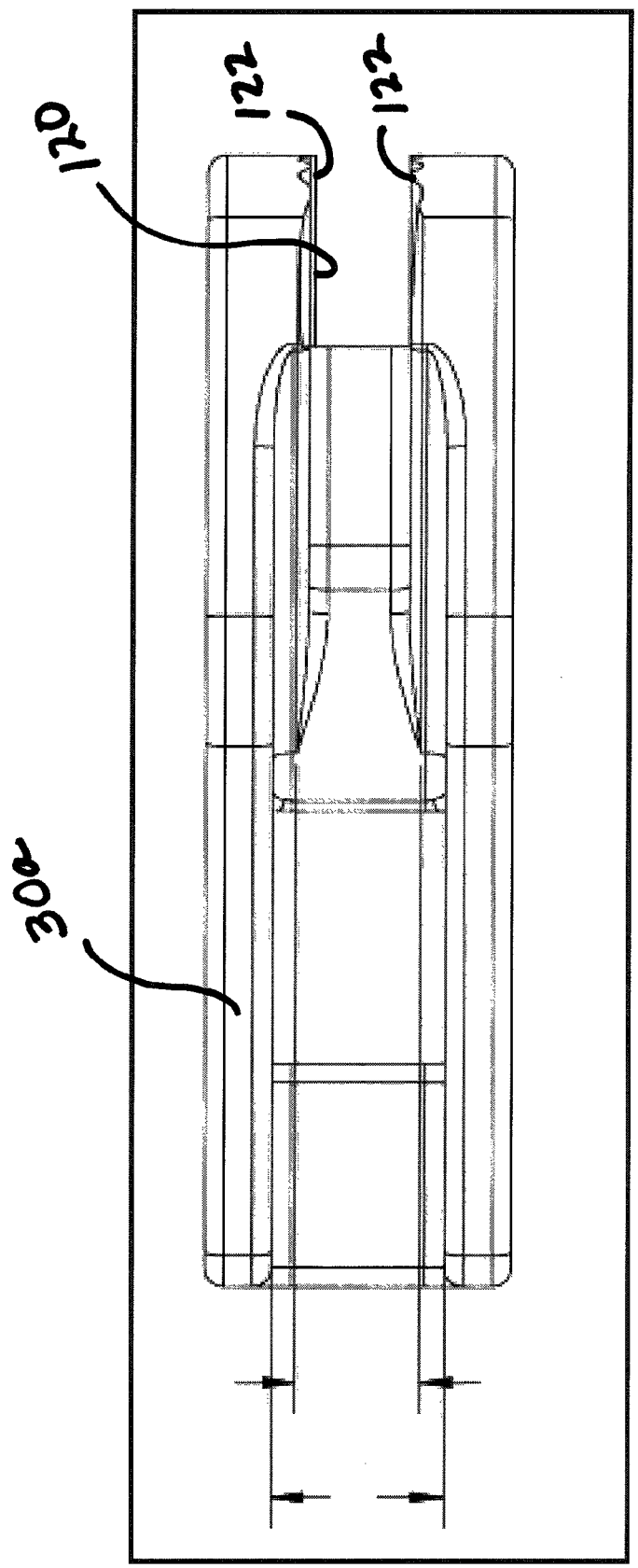
FIG. 7 is a bottom view of the clamp of FIG. 5.
Figure 8:
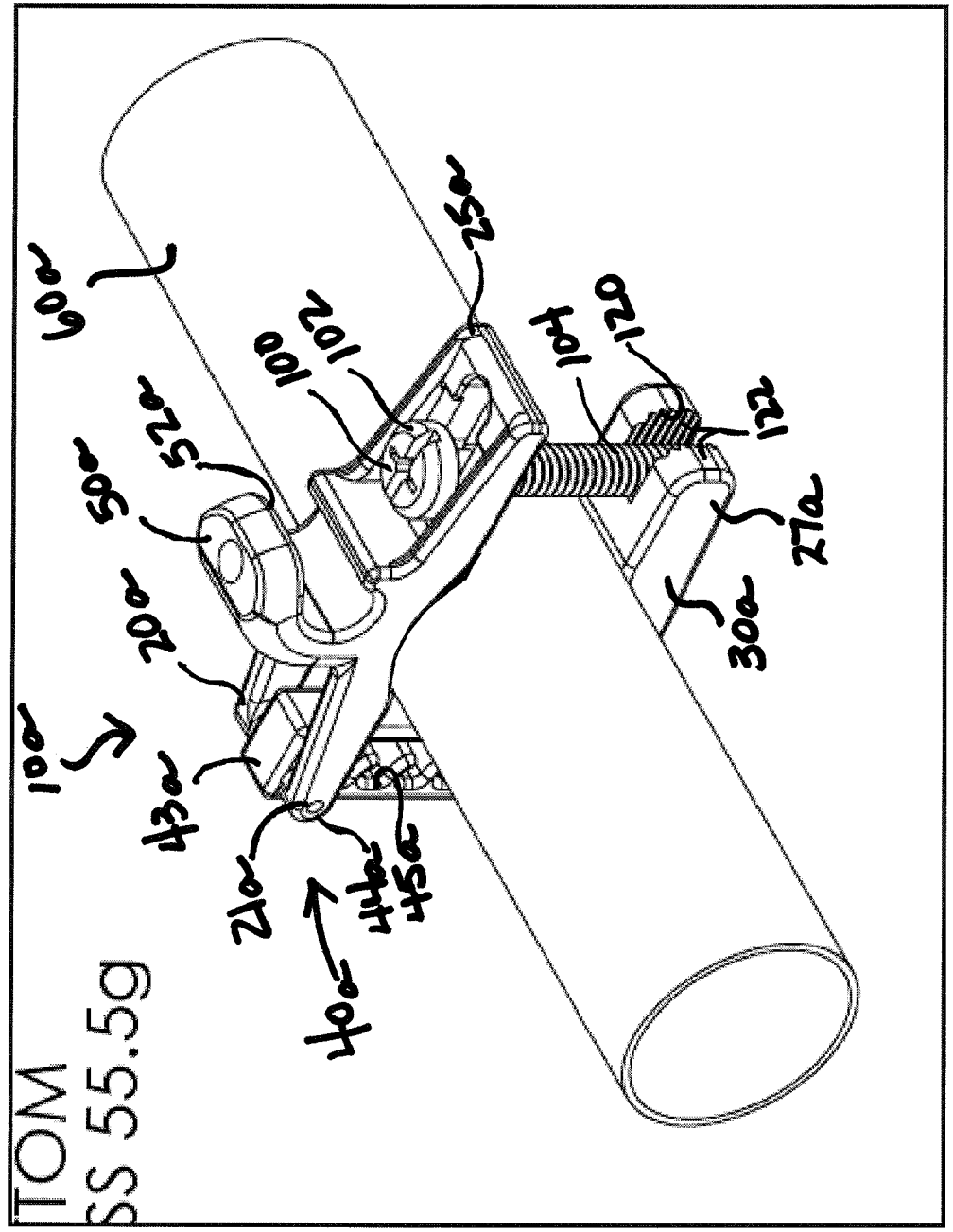
FIG. 8 is a perspective view of the clamp of FIG. 5 shown clamped to an object.
Figure 9:
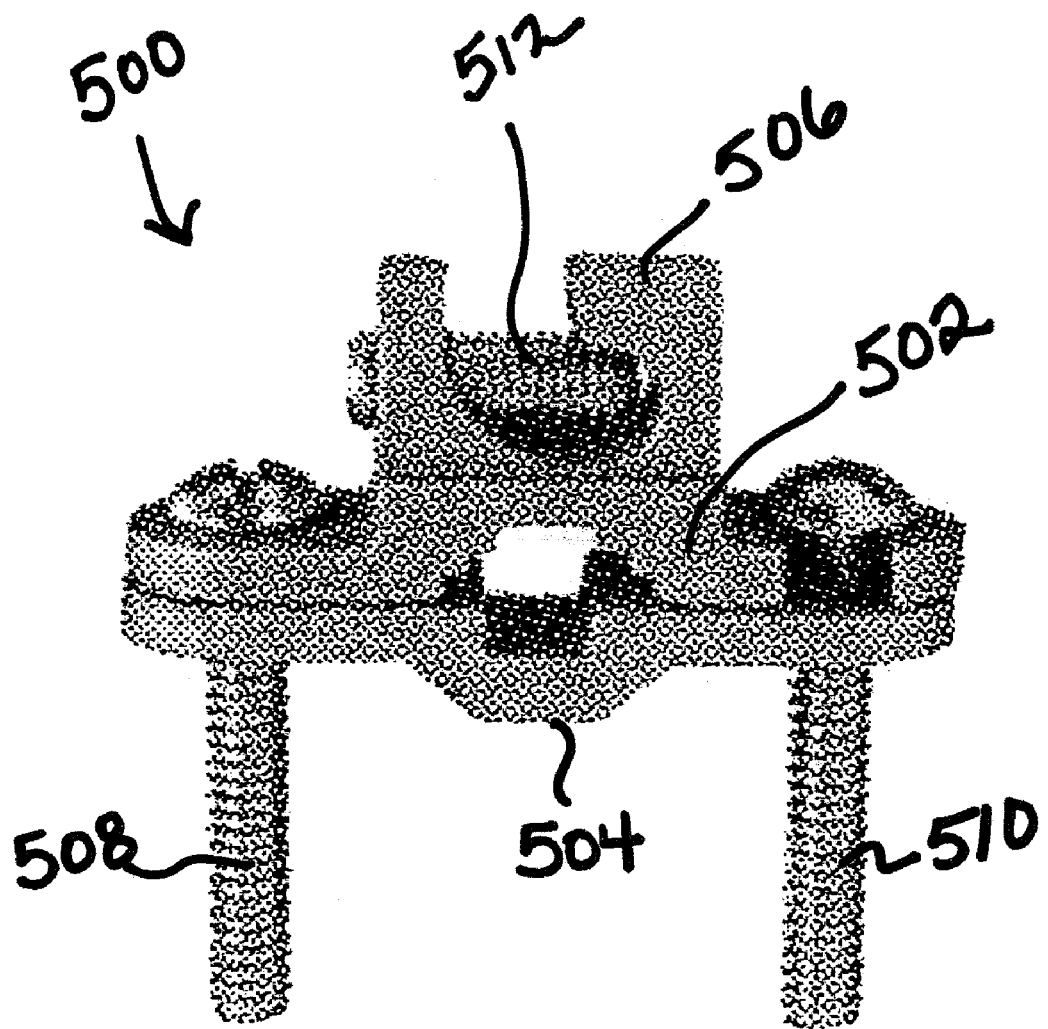
FIG. 9 shows a known ground clamp.

Still referring to FIGS. 5-8, for the embodiment shown, the opening 110 is an enclosed groove having a thickness T1 (see FIG. 6). The thickness T1 may be greater than the outer diameter of the smooth surfaced portion 106 of the fastener 100, less than the outer diameter of the head 102, and less than the outer diameter of the threaded portion 106. As a result, once the fastener 100 is threaded into the opening's enclosed groove 110, the smooth surfaced portion 106 of the fastener 100 is securely retained, and slidably moveable, within the groove 110 while also being capable of being turned to loosen or tighten the clamp 10a. This provides the advantage of reducing the chances of separating the fastener 100 from the clamp 10a. However, because the diameter of the smooth surfaced portion 106 is less than the thickness T1, it is easy to slide the fastener 100 from end to end of the groove 110 as long as the fastener 100 is positioned with the smooth surfaced portion 106 received within the groove 110. In one embodiment, the surface of the clamping member 20a is relatively flat (planar) around the perimeter of the groove 110. In this case, sliding the fastener 100 within the groove 110 does not change the relative vertical position of the fastener 100 with respect to the clamping member 20a. In another embodiment, shown, the surface of the clamping member 20a is not relatively planar around the perimeter of the opening 110. In one specific embodiment, the surface 112 of the clamping member 20a at the outer end of the groove 110 is vertically higher than the surface 114 of the clamping member 20a at the inner end of the groove 110. As a result, sliding the fastener 100 within the groove 110 changes the relative vertical position of the fastener 100 with respect to the clamping member 20a and the clamping member 30a. This provides for more adjustment options when the clamp 10a is being attached to and detached from the first object 60a.

Numerous embodiments have been described, hereinabove. It will be apparent to those skilled in the art that the above methods and apparatuses may incorporate changes and modifications without departing from the general scope of this invention. Each component of the clamp may be formed of any desired material having sufficient strength and rigidity to secure the objects desired. Such material may be electrically conductive. It is intended to include all such modifications and alterations in so far as they come within the scope of the appended claims or the equivalents thereof.

Having thus described the invention, it is now claimed:

1. A clamp comprising:
a first clamping member having first and second ends and comprising an electrically conductive portion;
a second clamping member having first and second ends;
a pivotal connection that pivotally connects the first end of the first clamping member to the first end of the second clamping member;
wherein the first and second clamping members are usable to clamp a first associated object;
a retainer operatively connected to the first clamping member that is designed to secure a second associated object to the clamp;
wherein the first and second clamping members are positional by pivoting the first clamping member with respect to the second clamping member about the pivotal connection between: (1) a clamped condition where the first and second clamping members join in electrical communication through the electrically conductive portion of the first clamping member the first associated object and the second associated object; and, (2) an unclamped condition where the first and second clamping members do not join in electrical communication the first associated object and the second associated object;
wherein the pivotal connection comprises a pivot pin and a pivot bracket that comprises at least two pivot pin receiving recesses that enable a user to adjust the size of the clamp between at least two corresponding sizes;
wherein the first and second clamping members are positional by pivoting the first clamping member with respect to the second clamping member about the pivotal connection in both sizes;
wherein the pivot bracket is attached to one of the first and second clamping members;
wherein the pivot pin is attached to the other of the first and second clamping members;
wherein the pivot bracket comprises a slot that comprises the at least two pivot pin receiving recesses and a connecting passage that communicates the at least two pivot pin receiving recesses; and,
wherein the pivot pin remains contained in the slot when the clamp is size adjusted and when the first clamping member is pivoted with respect to the second clamping member about the pivotal connection between the clamped condition and the unclamped condition.

2. The clamp of claim 1 further comprising:
a fastener that connects the second end of the first clamping member to the second end of the second clamping member.

3. The clamp of claim 1 wherein:
the first associated object is in physical contact with the ground; and,
the second associated object is a ground wire.

4. The clamp of claim 1 wherein:
the first clamping member comprises a recess that receives an outer surface of the first associated object; and,
the second clamping member comprises a recess that receives an outer surface of the first associated object.

5. The clamp of claim 1 wherein:
the pivot bracket is fixed to the second clamping member;
the pivot pin is attached to the first clamping member;
the pivot bracket comprises at least three pivot pin receiving recesses that enable a user to adjust the size of the clamp between at least three corresponding sizes;
the first and second clamping members are positional by pivoting the first clamping member with respect to the second clamping member about the pivotal connection in all three sizes; and,
the pivot bracket comprises a slot that comprises the at least three pivot pin receiving recesses and a connecting passage that communicates the at least three pivot pin receiving recesses.

6. A clamp comprising:
a first clamping member having first and second ends;
a second clamping member having first and second ends;
a pivotal connection that pivotally connects the first end of the first clamping member to the first end of the second clamping member, the pivotal connection comprising a pivot pin and a pivot bracket that comprises at least two pivot pin receiving recesses that enable a user to adjust the size of the clamp between at least two corresponding sizes;

wherein the first and second clamping members are positional by pivoting the first clamping member with respect to the second clamping member about the pivotal connection in both sizes between: (1) a clamped condition where the first and second clamping members secure a first associated object to the clamp; and, (2) an unclamped condition where the first and second clamping members do not secure the first associated object to the clamp;

wherein the pivot bracket is attached to one of the first and second clamping members;

wherein the pivot pin is attached to the other of the first and second clamping members;

wherein the pivot bracket comprises a slot that comprises the at least two pivot pin receiving recesses and a connecting passage that communicates the at least two pivot pin receiving recesses; and, wherein the pivot pin remains contained in the slot when the clamp is size adjusted and when the first clamping member is pivoted with respect to the second clamping member about the pivotal connection between the clamped condition and the unclamped condition.

7. The clamp of claim 6 further comprising:
a fastener that connects the second end of the first clamping member to the second end of the second clamping member.

8. The clamp of claim 6 wherein:
the clamp further comprises a retainer operatively connected to the first clamping member that is designed to secure a second associated object to the clamp;
the first clamping member comprises an electrically conductive portion;
when in the clamped condition the first and second clamping members join in electrical communication through the electrically conductive portion of the first clamping member the first associated object and the second associated object; and,
when in the unclamped condition the first and second clamping members do not join in electrical communication the first associated object and the second associated object.

9. The clamp of claim 8 wherein:
the first associated object is in physical contact with the ground; and,
the second associated object is a ground wire.

10. The clamp of claim 6 wherein:
the first clamping member comprises a recess that receives an outer surface of the first associated object; and,
the second clamping member comprises a recess that receives an outer surface of the first associated object.

11. The clamp of claim 6 wherein:
the clamp further comprises a clasp comprising at least two notches and the clasp is attached to one of the second ends of the first and second clamping members;
the clamp further comprises an interlocking member comprising a tip and the interlocking member is attached to the other of the second ends of the first and second clamping members; and,
the tip is removably lodgable within the at least two notches to enable a user to adjust the size of the clamp between at least two corresponding sizes.

12. A clamp comprising:
a first clamping member having first and second ends;
a second clamping member having first and second ends;
a pivotal connection that pivotally connects the first end of the first clamping member to the first end of the second clamping member;
a device that connects the second end of the first clamping member to the second end of the second clamping member;
wherein the first and second clamping members are positional by pivoting the first clamping member with respect to the second clamping member about the pivotal connection between: (1) a clamped condition where the first and second clamping members secure a first associated object to the clamp; and, (2) an unclamped condition where the first and second clamping members do not secure the first associated object to the clamp;
a retainer operatively connected to the first clamping member that is designed to secure to secure a second associated object to the clamp;
wherein the pivotal connection comprises a pivot pin and a pivot bracket that comprises at east two pivot pin receiving recesses that enable a user to adjust the size of the clamp between at least two corresponding sizes;
wherein the first and second clamping members are positional by pivoting the first clamping member with respect to the second clamping member about the pivotal connection in both sizes;
wherein the pivot bracket is attached to one of the first and second clamping members;
wherein the pivot pin is attached to the other of the first and second clamping members;
wherein the pivot bracket comprises a slot that comprises the at least two pivot pin receiving recesses and a connecting passage that communicates the at least two pivot pin receiving recesses; and,
wherein the pivot pin remains contained in the slot when the clamp is size adjusted and when the first clamping member is pivoted with respect to the second clamping member about the pivotal connection between the clamped condition and the unclamped condition.

13. The clamp of claim 12 wherein:
the device is a fastener having a head, a threaded portion, and a smooth surfaced portion along its length;
the first clamping member has a groove that slidingly receives the smooth surfaced portion of the fastener; and,
the second clamping member has an opening defined by a threaded portion that receives the threaded portion of the fastener.

14. The clamp of claim 13 wherein:
the opening in the second clamping member is an open ended groove:
the threaded portion of the fastener is slidable into the open end of the groove in the second clamping member at two or more distinct relative vertical positions; and,
when the threaded portion of the fastener engages the threaded portion of the second clamping member, the fastener can be rotated with respect to the second clamping member to adjust the relative vertical position of the fastener with respect to the second clamping member.

15. The clamp of claim 13 wherein the groove in the first clamping member is enclosed and has a thickness that is:
greater than the outer diameter of the smooth surfaced portion of the fastener;
less than the outer diameter of the head of the fastener; and,
less than the outer diameter of the threaded portion of the fastener.

* * * * *